Aug. 18, 1953     H. SLUIJTER     2,649,086
APPARATUS FOR CLOSING OFF THE URETHRA OF WOMEN
Filed Jan. 16, 1950

INVENTOR.
Henry Sluijter
BY
Young, Emery & Thompson
Attys.

Patented Aug. 18, 1953

2,649,086

UNITED STATES PATENT OFFICE 2,649,086

APPARATUS FOR CLOSING OFF THE URETHRA OF WOMEN

Henry Sluijter, Rotterdam, Netherlands

Application January 16, 1950, Serial No. 138,742
In the Netherlands January 17, 1949

3 Claims. (Cl. 128—1)

Slackening of the contractors of the urethra of women is the cause of incontinence.

This could be remedied by closing the urethra by pressure.

The invention provides a make-shift, consisting of a tubular or bar-shaped elastic member, having a thickened portion, the elastic member being bent symmetrically with respect to the thickened portion according to a bent line lying in a plane and returning into itself, said member having such elastic properties that deforming thereof is only possible in the plane of the member.

When being introduced into the vagina the elastic member is compressed the thickened portion pressing against the wall of the urethra, so that it is closed off.

The resilient action of the elastic member sees to it that the member presses against the walls of the vagina, and consequently maintains its position. The resilient action of the elastic member may be effected according to the invention by introducing a resilient strip into the member, the main plane of the strip being normal to the plane in which the member is located. The purpose of applying the resilient strip in this manner is to make resiliency only possible in the plane of the member.

According to the invention a screw spring may be provided round the resilient strip. The screw spring serves for protecting the member against cutting of the resilient strip into the material of the member.

The invention is hereinafter elucidated by a description of the accompanying drawing.

In this drawing—

Figure 1:
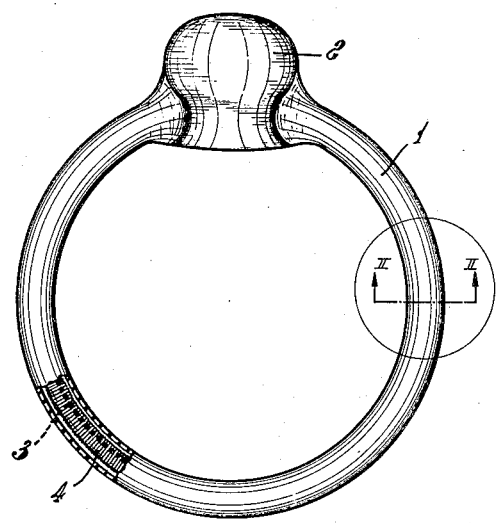
Fig. 1 is a plan view, partly broken away.
Figure 2:
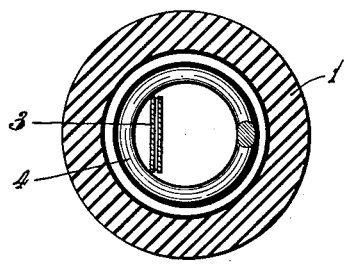
Fig. 2 is a cross section taken on the line II—II of Fig. 1.

In Fig. 1 I is a circular bent, tubular member, having a thickened portion 2. The member and the thickened portion may be manufactured of rubber, caoutchouc or other elastic material. In this member a resilient strip 3 is provided, of which the main plane is normal to the plane of the member, so that the member cannot deflect in an undesired direction outside the plane of the member.

In order to protect the wall of the member against cutting of the strip 3 a screw spring 4 is provided round the strip 3 in the cavity of the member.

The application of the apparatus is as follows: The apparatus is introduced into the vagina of the user in compressed condition until the thickened portion 2 lies approximately at the point where the contractor of the urethra is located.

The apparatus is kept in its place by the resilient expansion of the member I against the wall of the vagina after the compressing force ceases to work.

I claim:

1. An apparatus for closing off the urethra of women, consisting of a ring-shaped elastic tubular member having an outwardly projecting thickened portion, and means in the tubular member to force the latter radially in all directions, whereby the member is deformable only in the plane thereof.

2. An apparatus for closing off the urethra of women according to claim 1, in which the means is in the form of a resilient strip provided in the elastic member, the main plane of which is normal to the plane of the member.

3. An apparatus for closing off the urethra of women according to claim 1, in which the means is in the form of a resilient strip provided in the elastic member the main plane of which is normal to the plane of the member, and in which a screw spring is provided around the resilient strip and in the elastic member to protect the latter from the resilient strip.

HENRY SLUIJTER.

References Cited in the file of this patent

UNITED STATES PATENTS

| Number | Name | Date |
|---|---|---|
| 40,949 | Scattergood | Dec. 15, 1863 |
| 1,221,518 | Dygert | Apr. 3, 1917 |
| 1,410,339 | Martinksa | Mar. 21, 1922 |
| 2,068,173 | Galves | Jan. 19, 1937 |
| 2,475,071 | Young | July 5, 1949 |
| 2,540,932 | Clark | Feb. 6, 1951 |